United States Patent
Fu et al.

(10) Patent No.: US 11,613,627 B2
(45) Date of Patent: Mar. 28, 2023

(54) HALOGEN-FREE FLAME RETARDANT THERMOPLASTIC POLYURETHANE ELASTOMER COMPOSITION AND PRODUCT AND FLAME RETARDANT PACKAGE THEREOF

(71) Applicant: Wanhua Chemical Group Co., Ltd., Shandong (CN)

(72) Inventors: Xiaoliang Fu, Yantai (CN); Qishan Huang, Yantai (CN); Zhibin Zhai, Yantai (CN); Li Yang, Yantai (CN)

(73) Assignee: WANHUA CHEMICAL GROUP CO., LTD., Shandong (CN)

( * ) Notice: Subject to any disclaimer, the term of this patent is extended or adjusted under 35 U.S.C. 154(b) by 28 days.

(21) Appl. No.: 15/762,303

(22) PCT Filed: Sep. 30, 2015

(86) PCT No.: PCT/CN2015/091232
§ 371 (c)(1),
(2) Date: Mar. 22, 2018

(87) PCT Pub. No.: WO2017/054176
PCT Pub. Date: Apr. 6, 2017

(65) Prior Publication Data
US 2018/0273727 A1 Sep. 27, 2018
US 2019/0330449 A9 Oct. 31, 2019

(30) Foreign Application Priority Data
Sep. 29, 2015 (CN) .......................... 201510630909.X

(51) Int. Cl.
*C08K 5/521* (2006.01)
*C08K 3/04* (2006.01)
(Continued)

(52) U.S. Cl.
CPC ............... *C08K 5/521* (2013.01); *C08K 3/04* (2013.01); *C08K 3/32* (2013.01); *C08K 5/34922* (2013.01);
(Continued)

(58) Field of Classification Search
None
See application file for complete search history.

(56) References Cited

U.S. PATENT DOCUMENTS

| 5,739,173 A | 4/1998 | Lutter et al. |
| 6,777,466 B2 | 8/2004 | Eckstein et al. |

(Continued)

FOREIGN PATENT DOCUMENTS

| CN | 101993588 A | 3/2011 |
| CN | 102303770 A | 1/2012 |

(Continued)

OTHER PUBLICATIONS

CN103467969 A, Dec. 25, 2013, Machine translation (Year: 2013).*
(Continued)

*Primary Examiner* — Satya B Sastri
(74) *Attorney, Agent, or Firm* — Armstrong Teasdale LLP

(57) ABSTRACT

A halogen-free flame retardant thermoplastic polyurethane elastomer composition and product and flame retardant package thereof comprised thermoplastic polyurethane and halogen-free flame retardant package. The halogen-free flame retardant comprises inorganic phosphorus-based flame retardant and can further comprise expandable graphite, melamine or derivatives thereof and organic phosphorus-based flame retardant. The composition is environmentally friendly and safe, the comprehensive mechanical properties thereof are excellent, does not drip during the burning test, passed UL94 with rating of V0–1.5 mm, and the limiting oxygen index thereof can be up to 35%.

9 Claims, 1 Drawing Sheet

(51) Int. Cl.
*C08K 3/32* (2006.01)
*C08L 75/08* (2006.01)
*C08K 5/3492* (2006.01)
*C09K 21/04* (2006.01)
*C09K 21/10* (2006.01)
*C09K 21/12* (2006.01)

(52) U.S. Cl.
CPC .......... *C08K 5/34924* (2013.01); *C08L 75/08* (2013.01); *C09K 21/04* (2013.01); *C09K 21/10* (2013.01); *C09K 21/12* (2013.01); *C08K 2003/322* (2013.01); *C08K 2003/323* (2013.01); *C08K 2003/324* (2013.01); *C08K 2003/325* (2013.01); *C08K 2003/326* (2013.01); *C08K 2003/327* (2013.01); *C08K 2003/328* (2013.01)

(56) References Cited

U.S. PATENT DOCUMENTS

| | | | | |
|---|---|---|---|---|
| 8,354,463 | B2* | 1/2013 | Fever | C09K 21/04 524/415 |
| 2008/0090950 | A1* | 4/2008 | Costanzi | C08K 3/32 524/414 |
| 2009/0326108 | A1 | 12/2009 | Kim et al. | |
| 2013/0338279 | A1* | 12/2013 | Vanhalle | C08K 5/52 524/127 |
| 2015/0005416 | A1* | 1/2015 | Zucchelli | C08K 5/3492 524/89 |
| 2016/0046779 | A1* | 2/2016 | Neff | C08J 9/0023 521/107 |
| 2016/0083560 | A1* | 3/2016 | Fudala | C08K 3/32 524/101 |
| 2016/0177051 | A1* | 6/2016 | Constantinescu | C08L 61/28 524/100 |
| 2016/0297943 | A1* | 10/2016 | Daschlein | B29C 44/3461 |
| 2017/0260355 | A1* | 9/2017 | Makadia | C08G 18/44 |

FOREIGN PATENT DOCUMENTS

| | | | | | |
|---|---|---|---|---|---|
| CN | 102838098 | A | * | 12/2012 | |
| CN | 103467969 | A | * | 12/2013 | |
| CN | 103467969 | A | | 12/2013 | |
| CN | 103492470 | A | | 1/2014 | |
| CN | 103756546 | A | | 4/2014 | |
| CN | 103923405 | A | | 7/2014 | |
| CN | 104072977 | A | | 10/2014 | |
| CN | 104441835 | A | | 3/2015 | |
| CN | 104650441 | A | | 5/2015 | |
| JP | 2005054163 | A | * | 3/2005 | |
| WO | WO-2011160832 | A2 | * | 12/2011 | ............... C08K 3/04 |
| WO | 2012076905 | A1 | | 6/2012 | |
| WO | 2014179092 | A1 | | 11/2014 | |

OTHER PUBLICATIONS

CN-102838098-A, Dec. 2012, Machine translation (Year: 2012).*
Supplementary European Search Report issued in EP15905088.9, dated Mar. 4, 2019, 7 pages.
International Search Report issued in PCT/CN2015/091232 dated May 5, 2016.
First Office Action for CN Application No. 201510630909.X, dated Aug. 20, 2018, and partial English translation thereof, 12 pages.
Second Office Action for CN Application No. 201510630909.X, dated Jun. 25, 2019, and partial English translation thereof, 10 pages.

* cited by examiner

HALOGEN-FREE FLAME RETARDANT THERMOPLASTIC POLYURETHANE ELASTOMER COMPOSITION AND PRODUCT AND FLAME RETARDANT PACKAGE THEREOF

This application claims priority to International Application PCT/CN2015/091232, filed on Sep. 30, 2015, which claims priority to CN Patent Application No. 201510630909.X, filed on Sep. 29, 2015, the disclosures of which are hereby expressly incorporated by reference in their entireties.

TECHNICAL FIELD

The present invention relates to a flame retardant thermoplastic polyurethane (TPU) elastomer composition, particularly relates to a flame retardant thermoplastic polyurethane (TPU) elastomer composition comprising a halogen-free flame retardant package and articles thereof, which belongs to the field of polyurethane elastomers.

TECHNICAL BACKGROUND

Thermoplastic polyurethane (TPU) is widely used in the fields of wire and cable, pipe and profile, film and universal injection molding products due to its excellent tensile strength, tear strength, abrasion resistance and processability. However, the disadvantages of the poor flame resistance, low oxygen index and the large amount of flaming-drip during combustion of the thermoplastic polyurethane itself have limited its application in some fields with specific requirements for flame resistance.

Conventional flame retardant additives based on halogens such as bromine, chlorine and fluorine have been widely used in TPU compositions to provide flame resistance. In recent years, as most countries and industries have increased the environmental safety requirements, using other non-halogen flame retardant system in TPU formulations design is required.

Noveon Co. discloses the use of melamine cyanurate as the only organic flame retardant additive in a flame retardant TPU composition in U.S. Pat. No. 6,777,466, the composition disclosed in this patent is halogen free and environmentally friendly and preferably retains the mechanical properties of the thermoplastic polyurethane, however, the dripping during combustion of the composition can still happen, which limit the use of the composition in some areas requiring high flame resistance.

Lubrizol Co. discloses a flame retardant polyurethane elastomer composition containing one or more components of organic phosphate, melamine derivative, dipentaerythritol in U.S. Patent Publication No. US20090326108. The composition disclosed in this patent is halogen-free and environmentally friendly, has higher flame resistance, but the mechanical properties of the composition are adversely affected.

Huntsman discloses a flame retardant polyurethane elastomer composition containing components of metal oxides, ammonium polyphosphates and the phosphates of its derivatives, oligomeric phosphates in CN201280011122.X, the composition in this patent sacrifices the mechanical properties of the thermoplastic polyurethanes, at the same time, as the composition exposes in a high-temperature and high-humidity environment for long term, some of additives can easily migrate, thus limit the application of the composition.

Shin-Etsu company discloses a flame retardant polyurethane elastomer composition containing components of ammonium polyphosphate, melamine phosphate, and surface-treated ammonium polyphosphate, pentaerythritol and derivative thereof, and organosiloxanes in CN201010258036.1, this composition is excellent in flame resistance and low in smoke but also sacrifices the mechanical properties of the thermoplastic polyurethanes and limits the use of the compositions in the fields requiring high mechanical properties.

It can be seen that some of the existing flame retardant TPU compositions drip during the combustion process, and the mechanical properties of some of the existing flame retardant TPU are greatly reduced, all of which greatly limit the application of the compositions disclosed above, especially in some applications of the fields such as automotive, military and energy fields, which require both high mechanical properties and also high level of flame resistance, while flaming-drip does not occur in the combustion process.

SUMMARY

The object of the present invention is to provide a halogen-free flame retardant thermoplastic polyurethane (TPU) elastomer composition which incorporates inorganic phosphorus-based flame retardant as flame-retardant component to impart high flame resistance to the thermoplastic polyurethane composition, while without weakening its mechanical properties, to solve the problem presented in the prior art that it is difficult to achieve a combination of high flame resistance and excellent mechanical properties.

In order to achieve the above object of the present invention, the technical solution adopted by the present invention is as follows:

A halogen-free flame retardant thermoplastic polyurethane elastomer composition comprising a thermoplastic polyurethane elastomer and a halogen-free flame retardant package comprising, by weight of the thermoplastic polyurethane elastomer:

Inorganic phosphorus-based flame retardant: 6-95 wt %;
Expandable graphite: 0-20 wt %;
Melamine or derivatives thereof: 0-65 wt %;
Organic phosphorus-based flame retardant: 0-45 wt %.

A person skilled in the art can understand that when the content of a certain component is "0", the component is not contained.

In the present invention, as a preferred solution, the halogen-free flame retardant package comprises, based on the weight of the thermoplastic polyurethane elastomer: 6-95 wt %, preferably 11-65 wt %, more preferably 18-45 wt % of an inorganic phosphorus-based flame retardant; 1 to 20 wt %, preferably 1 to 9 wt %, more preferably 3 to 7 wt % of expandable graphite; 0 to 65 wt %, preferably 8 to 50 wt %, more preferably 14 to 38 wt % of melamine or derivatives thereof; 0-45 wt %, preferably 5-35 wt %, more preferably 10-25 wt % of organic phosphorus-based flame retardant.

In the present invention, as a preferred solution, the halogen-free flame retardant package comprises, based on the weight of the thermoplastic polyurethane elastomer: 6-95 wt %, preferably 11-65 wt %, more preferably 18-45 wt % of inorganic phosphorus-based flame retardant; 0 to 20 wt %, preferably 1 to 9 wt %, more preferably 3 to 7 wt % of expandable graphite; 1 to 65 wt %, preferably 8 to 50 wt %, more preferably 14 to 38 wt % of melamine or derivatives thereof; 0-45 wt %, preferably 5-35 wt %, more preferably 10-25 wt % of organic phosphorus-based flame retardant.

In the present invention, as a preferred solution, the halogen-free flame retardant package comprises, based on the weight of the thermoplastic polyurethane elastomer: 6-95 wt %, preferably 11-65 wt %, more preferably 18-45 wt % of inorganic phosphorus-based flame retardant; 1 to 20 wt %, preferably 1 to 9 wt %, more preferably 3 to 7 wt % of expandable graphite; 1 to 65 wt %, preferably 8 to 50 wt %, more preferably 14 to 38 wt % of melamine or derivatives thereof; 0-45 wt %, preferably 5-35 wt %, more preferably 10-25 wt % of organic phosphorus-based flame retardant.

More preferably, the halogen-free flame retardant package comprises, based on the weight of the thermoplastic polyurethane elastomer:
Inorganic phosphorus-based flame retardant: 11-65 wt %;
Expandable graphite: 1-9 wt %;
Melamine or derivatives thereof: 8-50 wt %;
Organic phosphorus-based flame retardants: 5-35 wt %;
Further preferably, the halogen-free flame retardant package comprises, based on the weight of the thermoplastic polyurethane elastomer:
Inorganic phosphorus-based flame retardant: 18-45 wt %;
Expandable graphite: 3-7 wt %;
Melamine or derivatives thereof: 14-38 wt %;
Organic phosphorus-based flame retardant: 10-25 wt %.

In the present invention, as a further preferred solution, the weight ratio of the halogen-free flame retardant package to the thermoplastic polyurethane elastomer in the halogen-free flame retardant thermoplastic polyurethane elastomer composition is 0.06-1:1, preferably 0.20-0.80:1, under the premise of comprehensive consideration of cost (added amount) and flame retardant effect, further preferably 0.20-0.50:1, more preferably 0.25-0.45:1.

In the present invention, the weight-average molecular weight (Mw) of the thermoplastic polyurethane is preferably from 60,000 to 800,000, more preferably from 90,000 to 45,000; the hardness is preferably from Shore-A45 to Shore-D80, more preferably from Shore-A65 to Shore-D54.

In the present invention, the thermoplastic polyurethane elastomer as used is preferably a thermoplastic polyurethane elastomer having excellent tensile strength, tear strength and elongation, the tensile strength of the thermoplastic polyurethane elastomer is preferably 30 to 50 MPa, the tear strength is preferably 90-120 N/mm, and the elongation is preferably 400% to 700%.

In the present invention, the thermoplastic polyurethane is prepared by the reaction of polyisocyanates and hydroxyl-terminated intermediates under the effect of chain extender.

In the present invention, the polyisocyanates are preferably selected from the group consisting of aromatic polyisocyanates, aliphatic polyisocyanates, and a mixture of two or more thereof; the polyisocyanates include, but is not limited to 4,4'-diphenylmethane diisocyanate (4,4'-MDI), 2,4'-diphenylmethane diisocyanate (2,4'-MDI), 2,2'-diphenylmethane diisocyanate (2,2'-MDI), xylylene diisocyanate (XDI), 1,5-naphthalene diisocyanate (NDI), p-phenylene diisocyanate (PPDI), toluene diisocyanate (TDI), isophorone diisocyanate (IPDI), 1,4-cyclohexyl diisocyanates (CHDI), hexamethylene diisocyanate (HDI), decane-1,10-diisocyanate or dicyclohexylmethane-4,4'-diisocyanate (H12MDI), further preferably 4,4'-diphenylmethane diisocyanate.

In the present invention, the hydroxyl-terminated intermediates are selected preferably from the group consisting of polyester polyols (hydroxyl-terminated polyesters), polyether polyols (hydroxyl-terminated polyethers), and a mixture of two or more thereof.

In the present invention, the hydroxyl-terminated polyesters, that is, the polyester polyols, are preferably selected from the group consisting of linear hydroxyl-terminated polyester polyols, polylactone polyols, polycarbonate polyols, and a mixture of two or more thereof.

In the present invention, the thermoplastic polyurethane prepared by the linear hydroxyl-terminated polyester polyols, polylactone polyols or polycarbonates as hydroxyl-terminated polyesters is respectively polyester polyurethane, polylactone polyurethane or polycarbonate polyurethane; the thermoplastic polyurethane prepared by the polyether polyols as hydroxyl-terminated polyesters is polyether polyurethane.

In the present invention, the thermoplastic polyurethane is preferably polyester polyurethane and/or polyether polyurethane.

In the present invention, the linear hydroxyl-terminated polyester polyols can be prepared by esterification or transesterification of dihydric alcohols with dicarboxylic acids, anhydrides or carboxylic acid esters. The number average molecular weight (Mn) of the linear hydroxyl-terminated polyester polyols is preferably 500-10000, more preferably 700-5000, further preferably 700-4000; its acid value is 0-1.0 mgKOH/g, preferably 0.1-0.5 mgKOH/g.

In the present invention, the dihydric alcohols used in the preparation of the linear hydroxyl-terminated polyester polyols are preferably selected from the group consisting of aliphatic dihydric alcohols, aromatic dihydric alcohols, and a mixture of two or more thereof; more preferably one or two or more of the dihydric alcohols having 2 to 12 carbon atoms, including but not limited to one or two or more of ethylene glycol, 1,2-propanediol, 1,3-propanediol, 1,3-butanediol, 1,4-butanediol, 1,5-pentanediol, 1,6-hexanediol, 2,2-dimethyl-1,3-propylene glycol, 1,4-cyclohexanedimethanol, decanediol and dodecanediol, further preferably 1,4-butlanediol.

In the present invention, the dicarboxylic acids, anhydrides or carboxylic acid esters used in the preparation of the linear hydroxyl-terminated polyester polyol are selected from the group consisting of aliphatic, alicyclic and aromatic dicarboxylic acids or anhydrides, carboxylic acid esters, and a mixture of two or more thereof; preferably are selected from the group consisting of dicarboxylic acids, anhydrides, carboxylic acid esters having 4 to 15 carbon atoms, and a mixture of two or more thereof; more preferably are selected from the group consisting of phthalic acid, phthalic anhydride, dimethyl ortho phthalate, dimethyl terephthalate, succinic acid, glutaric acid, adipic acid, pimelic acid, suberic acid, azelaic acid, sebacic acid, dodecanedioic acid, isophthalic acid, terephthalic acid, cyclohexane dicarboxylic acid, ortho phthalic anhydride and tetrahydro ortho phthalic anhydride; further preferably one or two or three of adipic acid, ortho phthalic anhydride and tetrahydro ortho phthalic anhydride.

In the present invention, the molar ratio of the dihydric alcohols to the dicarboxylic acids, anhydrides or carboxylic acid esters in the preparation of the linear hydroxyl-terminated polyester polyols is preferably from 1.0 to 3.0, more preferably from 1.02 to 2.0.

In the present invention, the polylactone polyol is preferably polycaprolactone polyol prepared by ε-caprolactone monomer and initiators under the initiation of a catalyst. The number average molecular weight (Mn) of the polycaprolactone polyol is preferably 500 to 3000, and more preferably 1000 to 2000.

In the present invention, the initiators used in preparation of the polylactone polyol are selected from the group consisting of dihydric alcohols, diamines, alcohol amines, polyols, and a mixture of two or more thereof, preferably are selected from the group consisting of ethylene glycol, 1,2-propanediol, 1,3-propanediol, diethylene glycol, 1,3-butanediol, 1,4-butanediol, 1,5-pentanediol, neopentyl glycol, 1,6-hexanediol, 1,4-cyclohexanediol, trimethylolpropane, pentaerythritol, 3,3'-dichloro-4,4'-diamino diphenylmethane, diethyltoluenediamine, monoethanolamine, diethanolamine, and a mixture of two or more thereof; more preferably are selected from the group consisting of ethylene glycol, 1,4-butanediol, neopentyl glycol, diethylene glycol, TMP, pentaerythritol, and a mixture of two or more thereof.

In the present invention, the polycarbonate polyols can be synthesized by phosgene methods, carbon dioxide regulated copolymerization methods, cyclic carbonate ring-opening polymerization methods or transesterification methods.

In the present invention, the polycarbonate polyols are preferably synthesized to polycarbonates by transesterification of dihydric alcohols and carbonic esters.

In the present invention, during the synthesis of the polycarbonate polyols by transesterification, the dihydric alcohols are preferably selected from the group consisting of 1,2-ethanediol, 1,4-butanediol (BDO), 1,5-pentanediol (PDO), 1,6-hexanediol (HDO), and a mixture of two or more thereof more preferably 1,4-butanediol (BDO) and/or 1,5-pentanediol (PDO). The carbonic esters are preferably dimethyl carbonate and diethyl carbonate; more preferably dimethyl carbonate.

In the present invention, the number average molecular weight (Mn) of the polycarbonate polyols is 500-4000, preferably 1000-3000.

In the present invention, the hydroxyl-terminated polyethers, that is, the polyether polyols, are a linear hydroxyl-terminated polyethers, which are prepared by the reaction of a initiator with an epoxy compound having 2 to 6 carbon atoms.

In the present invention, the number average molecular weight (Mn) of the linear hydroxyl-terminated polyethers is 500 to 10,000, preferably 700 to 4,000.

In the present invention, the initiator used in the preparation process of the linear hydroxyl-terminated polyethers is selected from the group consisting of low molecular weight compounds containing hydroxyl group, low molecular weight compounds containing amino group, low molecular weight compounds containing both hydroxyl group and amino group, and a mixture of two or more thereof. The initiator is preferably selected from the group consisting of water, propylene glycol, glycerol, trimethylolpropane, ethylenediamine pentaerythritol, xylitol, triethylene diamine, sorbitol, ethylene glycol, bisphenol A, toluene diamine, and a mixture of two or more thereof; more preferably water, propylene glycol and/or glycerol.

In the present invention, the epoxy compound used in the preparation of the linear hydroxyl-terminated polyethers is preferably one or two or three of ethylene oxide, propylene oxide and tetrahydrofuran (THF).

In the present invention, the linear hydroxyl-terminated polyethers are preferably poly(ethylene glycol) prepared by the reaction of ethylene oxide and ethylene glycol, the poly(propylene glycol) prepared by the reaction of propylene oxide and propylene glycol, or poly(tetramethylene glycol) (PTMEG) prepared by the reaction of water and tetrahydrofuran (THF), the reaction product copolyether of THF and ethylene oxide or the reaction product copolyether of THF and propylene oxide; the more preferred linear hydroxyl-terminated polyether is polytetramethylene ether glycol (PTMEG).

In the present invention, the chain extender used in the preparation of the thermoplastic polyurethane is selected from the group consisting of dihydric alcohols having 2 to 10 carbon atoms, and a mixture of two or more thereof. The preferred chain extender includes, but is not limited to, ethylene glycol, diethylene glycol, propylene glycol, dipropylene glycol, 1,4-butanediol, 1,6-hexanediol, 1,3-butanediol 1,5-pentanediol 1,4-cyclohexanediol, hydroquinone bis (hydroxyethyl) ether, neopentyl glycol and the like, more preferably 1,4-butanediol and/or hydroquinone bis(hydroxyethyl) ether.

In the present invention, the molar ratio of the polyisocyanates to the hydroxy-terminated intermediates is from 0.95 to 1.10, preferably from 0.96 to 1.02, and more preferably from 0.97 to 1.005.

In the present invention, the chain extender is used in an amount of 3% to 25%, preferably 5% to 20%, more preferably 7% to 13%, based on the total weight of the polyisocyanates and the hydroxyl-terminated intermediates.

In the present invention, as a preferred solution, the thermoplastic polyurethane is Wanhua Chemical WHT-1565, Wanhua Chemical WHT-1180, Wanhua Chemical WHT-1164, Wanhua Chemical WHT-8175, Wanhua Chemical WHT-8185, Wanhua Chemical WHT-8254, Wanhua Chemical WHT-2190, Wanhua Chemical WHT-7185 or Wanhua Chemical WHT-7190 produced by Wanhua Chemical Group Co., Ltd.

In a preferred embodiment of the present invention, the inorganic phosphorus-based flame retardant is an inorganic phosphate and/or an inorganic hypophosphite; preferably, the inorganic phosphate is selected from the group consisting of ammonium polyphosphate, triammonium pyrophosphate, ammonium pyrophosphate, magnesium ammonium phosphate, magnesium phosphate, aluminum phosphate, zinc phosphate, and a mixture of two or more thereof; the inorganic hypophosphite is selected from the group consisting of lithium hypophosphite, sodium hypophosphite, potassium hypophosphite, calcium hypophosphite, zinc hypophosphite, magnesium hypophosphite, iron hypophosphite, aluminum hypophosphite, lanthanum hypophosphite, yttrium hypophosphite, cerium hypophosphite, and a mixture of two or more thereof;

More preferably, the inorganic phosphorus-based flame retardant is selected from the group consisting of calcium hypophosphite, zinc hypophosphite, magnesium hypophosphite, iron hypophosphite, aluminum hypophosphite, lanthanum phosphinate, yttrium hypophosphite, cerium hypophosphite, and a mixture of two or more thereof; further preferably calcium hypophosphite and/or aluminum hypophosphite.

In the present invention, during the initial stage that the inorganic phosphorus-based flame retardant is heated to decompose, the inorganic phosphorus-based flame retardant will promote the surface dehydration of the thermoplastic polyurethane elastomer; the inorganic phosphorus-based flame retardant is further heated to decompose to form a phosphorus-containing strong acid so that the chain scission of the urethano in the thermoplastic polyurethane structure happens, and it further is dehydrated and carbonized, to form a extremely dense carbon layer on the surface of the material finally, thus isolating the heat source and gas source, which plays a role of flame retardant mainly in the condensed phase. In addition, a small amount of P-containing free radical intermediates can also be produced in the combustion process of the inorganic phosphorus-based flame retardant, which can capture the active hydrogen generated by the thermal decomposition of the system, and play a role of chain termination, to prevent further decomposition of internal material of the thermoplastic polyurethane elastomer, so that the inorganic phosphorus-based flame retardant also has a certain flame retardant effect in the gas phase. In addition, in the system of the present invention, when the temperature of the thermoplastic polyurethane elastomer is higher than 250° C., partial decomposition and preliminary chain scission of the urethane of the thermoplastic polyurethane elastomer happens under the effect of inorganic phosphorus-based flame retardant, thereby N-containing intermediates is generated, and the N-containing intermediates and the intermediates containing P free radical generated by the decomposition of the inorganic phosphorus-based flame retardants will have a synergistic effect, which reflects a special flame retardant effect of the inorganic phosphorus-based flame retardant in the thermoplastic elastomer, while other polymers, such as polyolefins and the like, do not have such particular flame retardant effect. Therefore, in the present invention, the inorganic phosphorous-based flame retardant can achieve a better flame retardant effect under a small additive amount of the flame retardant by the double flame-retardant effect of the condensed phase and the gas phase and the special flame-retardant effect in the thermoplastic polyurethane elastomer system, and substantially maintain the initial excellent mechanical properties of the thermoplastic polyurethane elastomer.

In the present invention, the initial expansion temperature of the expandable graphite is preferably 170-800° C., more preferably 190-600° C., and further preferably 210-500° C.; the average particle diameter of the expandable graphite is preferably 5 um-150 um; the expansion multiple is preferably 20-500 times, more preferably 25-300 times, and further preferably 30-250 times.

In the present invention, the expandable graphite employed begins to expand at the temperature above its initial expansion temperature, so as to form a very thick, porous carbonized layer which, although porous, these pores do not have complete communication with each other, and due to a greater thickness, the porous carbonized layer can be coordinated with the dense carbon layer formed by the inorganic phosphorus-based flame retardant, to promote the inorganic phosphorus-based flame retardants of the system to form the porous dense carbon layer synergistically, thereby isolating heat and gas source better, so as to delay and terminate the decomposition of the polymer, and the expandable graphite does not produce toxic and corrosive gases when heating, which can reduce the amount of smoke greatly.

In the present invention, the melamine or derivatives thereof decompose during heating to generate inert gas, which can dilute the oxygen in air and the combustible gas generated in the combustion process of the system and the heat source, thereby facilitating the isolation of gas source and heat source needed in the burning process of the thermoplastic polyurethane elastomer.

In the present invention, the melamine or derivatives thereof are preferably melamine and/or melamine cyanurate (MCA), more preferably melamine cyanurate. The melamine cyanurate contains a large amount of N element, which can generate synergistic effect with the P-free radical intermediates produced by the decomposition of the inorganic phosphorus-based flame retardant and promote the formation of dense carbon layer during the early heating stage of the thermoplastic polyurethane elastomer, so that to isolate the heat source, oxygen and combustible gas produced by the decomposition of the thermoplastic polyurethane at the early stage of chain scission of the urethano, to prevent further chain scission of the urethano, thus achieving an excellent flame retardant effect.

In the present invention, the organic phosphorus-based flame retardant is used as a flame retardant component. The organic phosphorus-based flame retardant can also be decomposed during the combustion to produce intermediates containing P-free radical, which can capture the active hydrogen generated by the thermal decomposition of the thermoplastic polyurethane elastomer, to prevent further chain scission reaction of the urethane, and to play a role of chain termination; at the same time, the organic phosphorus-based flame retardant, the inorganic phosphorus-based flame retardant of the present invention and melamine cyanurate will have synergistic flame-retardant effect in the combustion and heating process, through the synergistic effect of a small amount of inorganic phosphorus-based flame retardants, the flame retardant effect of adding more organic phosphorus-based flame retardants or melamine cyanuric acid salt can be achieved under the condition of smaller additive amount of total flame retardant. At the same time, the addition of organic phosphorus-based flame retardant can improve the processing performance to a certain extent and enlarge the final application field of the invention.

In the present invention, the organic phosphorus-based flame retardant may be an organic phosphorus-based flame retardant commonly used in the art. In a preferred embodiment, the organic phosphorus-based flame retardant has the structural formula of $$X_1-O-\underset{OX_2}{\underset{|}{\overset{O}{\overset{\|}{P}}}}+O-R-O-\underset{OX_3}{\underset{|}{\overset{O}{\overset{\|}{P}}}}\!\!\!\!\!\!\!\!\!\!\!_{n}-O-X_4$$

wherein R is

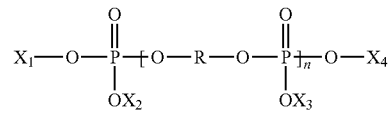

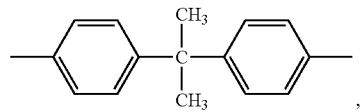

meta-substituted benzene ring or para-substituted benzene ring; n is an integer from 1 to 10, preferably from 1 to 5; $X_1$, $X_2$, $X_3$ and $X_4$ are the same or different and are each independently phenyl or C6-C18 aryl groups containing 1 to 3 C1-C2 alkyl substituent, preferably are

ortho-substituted

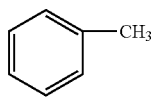

or ortho-substituted

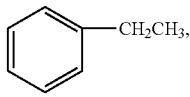

further preferably are

or ortho-substituted

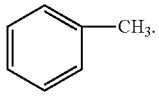

In the present invention, in addition to the flame retardant effect of the single flame retardant component, there is a synergistic flame retardant effect among the components in the flame retardant package; the expandable graphite and inorganic phosphorus-based flame retardants have a certain synergistic flame retardant effect: the expandable graphite and the inorganic phosphorus-based flame retardants can achieve sufficient carbon-forming effect by synergistic effect with less addition, and can produce expanded carbon layer with internal porous and dense surface; there are certain synergistic flame retardant effects between melamine cyanurate, inorganic phosphorus and organic phosphorus, which mainly reflect in the effective optimization of the dual flame retardant effect of condensed phase and gas phase; through the synergistic flame retardant effect between the components, a favorable flame retardant effect can be achieved under the condition of less additive amount and can reduce the flame retardant cost.

In the invention, the hardness of the halogen-free flame retardant thermoplastic polyurethane elastomer composition can reach 70A-56D, the tensile strength can reach 30-35 MPa, the tear strength can reach 90-120 N/mm and the elongation can reach 500%-760%, LOI can reach 30%-38%, and it can meets the UL94V-0 level under the thickness of 1.5 mm and 0.75 mm.

In the present invention, the halogen-free thermoplastic polyurethane elastomer composition can be prepared by one or more of the following processes:

(1) Pre-mixing the thermoplastic polyurethane elastomer and the flame retardant package, and then into a mixing equipment to obtained the composition by mixing.

(2) Pre-mixing the thermoplastic polyurethane elastomer and a part of flame retardant of the flame retardant package, into a mixing equipment, puting the remaining part of the flame retardant directly into the mixing equipment, and finally obtaining the composition by mixing.

(3) Puting the thermoplastic polyurethane elastomer and the flame retardant package into a mixing equipment separately and finally obtaining the composition by mixing in the mixing equipment.

The present invention further provides a halogen-free flame retardant package, which can be used in a flame retardant thermoplastic polyurethane elastomer composition, the halogen-free flame retardant package comprising, in parts by weight:

Inorganic phosphorus-based flame retardant: 6-95 parts;
Expandable graphite: 0-20 parts;
Melamine or derivatives thereof: 0-65 parts;
Organic phosphorus-based flame retardants: 0-45 parts.

In the present invention, as a preferred solution, the halogen-free flame retardant package comprises, in parts by weight: 6 to 95 parts, preferably 11 to 65 parts, and more preferably 18 to 45 parts of inorganic phosphorus-based flame retardant; 1-20 parts, preferably 1-9 parts, more preferably 3-7 parts of expandable graphite; 0-65 parts, preferably 8-50 parts, more preferably 14-38 parts of melamine or derivatives thereof; 0-45 parts, preferably 5-35 parts, more preferably 10-25 parts of organic phosphorus-based flame retardant.

In the present invention, as a preferred solution, the halogen-free flame retardant package comprises, in parts by weight, 6 to 95 parts, preferably 11 to 65 parts, and more preferably 18 to 45 parts of inorganic phosphorus-based flame retardant; 0 to 20 parts, preferably 1 to 9 parts, more preferably 3 to 7 parts, of expandable graphite; 1 to 65 parts, preferably 8 to 50 parts, more preferably 14 to 38 parts of melamine or derivatives thereof; 0-45 parts, preferably 5-35 parts, more preferably 10-25 parts of the organic phosphorus-based flame retardant.

In the present invention, as a preferred solution, the halogen-free flame retardant package comprises, in parts by weight: 6 to 95 parts, preferably 11 to 65 parts, and more preferably 18 to 45 parts of inorganic phosphorus-based flame retardant; 0 to 20 parts, preferably 1-9 parts, more preferably 3-7 parts of expandable graphite; 1-65 parts, preferably 8-50 parts, more preferably 14-38 parts of melamine or derivatives thereof; 0-45 parts, preferably 5-35 parts, more preferably 10-25 parts of the organic phosphorus-based flame retardant.

More preferably, the halogen-free flame retardant package comprises, in parts by weight:

Inorganic phosphorus-based flame retardant: 11-65 parts;
Expandable graphite: 1-9 parts;
Melamine or derivatives thereof: 8-50 parts;
Organic phosphorus-based flame retardants: 5-35 parts;

Further preferably, the halogen-free flame retardant package comprises, in parts by weight:

Inorganic phosphorus-based flame retardant: 18-45 parts;
Expandable graphite: 3-7 parts;
Melamine or derivatives thereof: 14-38 parts;
Organic phosphorus-based flame retardants: 10-25 parts.

The present invention further provides articles comprising the halogen-free thermoplastic polyurethane elastomer composition above mentioned, for example, cables (including civil cables and military cables), extruded pipes, injection molded products and the like; and also can be the cast film, blown film and military wire and so on, which require high flame resistance, mechanical performances and processing properties.

The positive effects of the present invention are:

(1) In the present invention, inorganic phosphorus is used as thermoplastic polyurethane elastomer flame retardant, a better flame retardant effect can be achieved under a small additive amount of the flame retardant by the dual flame-retardant effect of the condensed phase and the gas phase, and substantially maintain the initial excellent mechanical properties of the thermoplastic polyurethane elastomer, such as good tensile strength and tear strength, excellent resistance to thermal aging, high limiting oxygen index (LOI) and UL94 flame retardant rating, which solve the difficulties in the prior art that it is difficult to achieve a combination of high flame retardant rating and excellent mechanical properties. The flame-retardant TPU composition of the present invention can be applied to the wire and cable industry, the pipe and profile industry, the film industry, the general molding industry etc.

(2) Expandable graphite is introduced into the flame retardant thermoplastic polyurethane elastomer system, and the expandable graphite does not generate toxic and corrosive gas when heated, and can greatly reduce the amount of smoke, at the same time, it can promote the inorganic phosphorus-based flame retardant in the system to form porous dense carbon layer synergistically, which solve the phenomenon that the conventional flame retardant TPU system, especially the polyether system prone to dripping.

(3) The combination of inorganic phosphorus-based flame retardants and other types of flame retardants: expandable graphite, melamine or derivatives thereof, organic phosphorus-based flame retardants in the halogen-free flame retardant package can have a very good flame retardant effect.

(4) The limiting oxygen index of the halogen-free thermoplastic polyurethane elastomer composition of the present invention can be as high as 36% and the composition passes the $V0^{-1.5}$ mm test rating of UL94.

DETAILED DESCRIPTION

Figure 1:
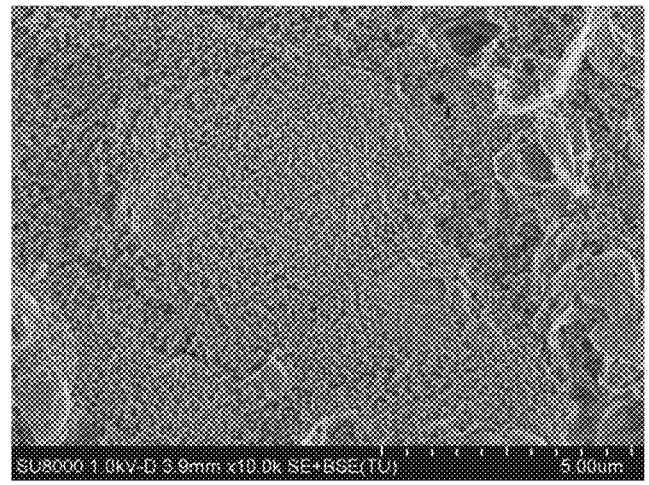
FIG. 1 is a SEM image of the interior of the carbon layer after combustion of the composition of Example 2.

The method provided by the present invention is further described in detail below, but present invention is not limited thereto by any means.

The materials used in the following examples and comparative examples are as follows:

The thermoplastic polyurethane elastomer is produced by Wanhua Chemical Group Co., Ltd., of which:

Wanhua Chemical Wanthane WHT-1565, polyester-based TPU, hardness 65A

Wanhua Chemical Wanthane WHT-1180, polyester-based TPU, hardness 80A

Wanhua Chemical Wanthane WHT-1164, polyester-based TPU, hardness 64D

Wanhua Chemical Wanthane WHT-8175, polyether-based TPU, hardness 75A

Wanhua Chemical Wanthane WHT-8185, polyether-based TPU, hardness 85A

Wanhua Chemical Wanthane WHT-8254, polyether-based TPU, hardness 54D

Wanhua Chemical Wanthane WHT-2190, polycaprolactone-based TPU, hardness 90A

Wanhua Chemical Wanthane WHT-7185, polycarbonate-based TPU, hardness 85A

Wanhua Chemical Wanthane WHT-7190, polycarbonate-based TPU, hardness 90A

Calcium hypophosphite, aluminum hypophosphite: 99 wt % of purity, Hubei Hongjia Chemical Co., Ltd.;

Expandable graphite (hereinafter referred to graphite): Initial expansion temperature 300° C., average particle size of 10 um, Zibo Wuwei Industrial Co., Ltd.;

Melamine cyanurate (MCA): 99.5 wt % of purity, Star-Better (Beijing) Chemical Materials Co., Ltd.;

Ammonium polyphosphate (APP), 99.8 wt % of purity, Kline Chemical;

Pentaerythritol: 99.5 wt % of purity, Yunnan Yuntianhua Co., Ltd.;

Aluminum phosphate: 99.5 wt % of purity, Liaoning Pengda Technology Co., Ltd.;

Magnesium oxide: 99.5 wt % of purity, Yingkou Hengyu Refractories Co., Ltd.;

Resorcinol bis(diphenyl phosphate) (RDP), 99.8 wt % of purity, Zhejiang Wansheng Chemical Co., Ltd.;

Bisphenol A bis(diphenyl phosphate) (BDP), 99.8 wt % of purity, Zhejiang Wansheng Chemical Co., Ltd.;

Meanwhile, the materials used in the following examples and comparative examples that are not listed above, are all of analytical grade.

The test standard of various performance indicators of the flame retardant thermoplastic polyurethane elastomer composition prepared in the Examples and Comparative Examples are as follows:

Hardness test using ASTM D2240 standard;

Tensile strength, elongation test using ASTM D412 standard;

Tear strength test using ASTM D624 standard;

Flame retardant performance test using UL94 standard;

LOI test using ASTM D2863 standard.

In the following Examples and Comparative Examples, the amounts of each formula for preparing the flame retardant thermoplastic polyurethane elastomer composition are all in parts by weight, as shown in Table 1 in detail. In preparation, after pre-mixing the thermoplastic polyurethane elastomer and flame retardant package according to the amount of Table 1, into a closed mixing equipment or an extruder and mixing for 80-120 seconds to obtain the flame retardant thermoplastic polyurethane elastomer composition.

TABLE 1

| | Polyurethane/ in parts by weight | Hypophosphite/ in parts by weight | Phosphate/ in parts by weight | Organic phosphorus-based flame retardants/ in parts by weight | Others/ in parts by weight |
|---|---|---|---|---|---|
| Example 1 | WHT-1565/100 | calcium hypophosphite/31.5 | | | |
| Example 2 | WHT-1565/100 | aluminum hypophosphite/45 | | | |
| Example 3 | WHT-1565/100 | | APP/45 | | |
| Example 4 | WHT-1565/100 | | aluminum phosphate/45 | | |
| Example 5 | WHT-1565/100 | zinc hypophosphite/65 | | | |
| Example 6 | WHT-1565/100 | iron hypophosphite/95 | | | |
| Example 7 | WHT-1565/100 | aluminum hypophosphite/19 | | | graphite/5 |
| Example 8 | WHT-1180/100 | | APP/40 | | graphite/5; |
| Example 9 | WHT-1180/100 | | aluminum phosphate/40 | | graphite/5; |
| Example 10 | WHT-1180/100 | calcium hypophosphite/6 | | | graphite/20 |
| Example 11 | WHT-1180/100 | aluminum hypophosphite/40 | | | graphite/4.5 |
| Example 12 | WHT-1180/100 | magnesium hypophosphite/65 | | | graphite/5 |
| Example 13 | WHT-1180/100 | aluminum hypophosphite/26 | | RDP/10 | graphite/1 |
| Example 14 | WHT-1180/100 | calcium hypophosphite/6 | | RDP/35 | graphite/2 |
| Example 15 | WHT-1180/100 | zinc hypophosphite/6 | | BDP/45 | graphite/3 |
| Example 16 | WHT-1164/100 | aluminum hypophosphite/14 | | | graphite/10 |
| Example 17 | WHT-1164/100 | aluminum hypophosphite/14 | | | MCA/29 |
| Example 18 | WHT-1164/100 | aluminum hypophosphite/7 | | | MCA/10 |
| Example 19 | WHT-1164/100 | calcium hypophosphite/31.5 | | | |
| Example 20 | WHT-1164/100 | calcium hypophosphite/21.5 | | | MCA/10 |
| Example 21 | WHT-1164/100 | zinc hypophosphite/25 | | | MCA/50 |
| Example 22 | WHT-1164/100 | magnesium hypophosphite/10 | | | MCA/65 |
| Example 23 | WHT-1164/100 | | APP/45 | | |
| Example 24 | WHT-1164/100 | | aluminum phosphate/45 | | |
| Example 25 | WHT-1164/100 | | APP/40 | | MCA/5 |
| Example 26 | WHT-1164/100 | | aluminum phosphate/40 | | MCA/5 |
| Example 27 | WHT-8185/100 | aluminum hypophosphite/9.5 | | | graphite/4.5 |
| Example 28 | WHT-8185/100 | aluminum hypophosphite/7 | | | graphite/2; MCA/5 |
| Example 29 | WHT-8185/100 | calcium hypophosphite/6 | | | graphite/2; MCA/8 |
| Example 30 | WHT-8185/100 | aluminum hypophosphite/35 | | | graphite/5; MCA/4 |
| Example 31 | WHT-8185/100 | magnesium hypophosphite/15 | | | graphite/2; MCA/36 |
| Example 32 | WHT-8185/100 | iron hypophosphite/18 | | | graphite/9; MCA/12 |
| Example 33 | WHT-8185/100 | aluminum hypophosphite/15 | | | graphite/10; MCA/8 |
| Example 34 | WHT-8185/100 | zinc hypophosphite/6 | | | graphite/1; MCA/50 |
| Example 35 | WHT-8185/100 | | aluminum phosphate/26 | | graphite/10; MCA/8 |
| Example 36 | WHT-8185/100 | | APP/20 | | graphite/1; MCA/50 |
| Example 37 | WHT-8254/100 | aluminum hypophosphite/18 | | | graphite/3; MCA/10 |
| Example 38 | WHT-8254/100 | aluminum hypophosphite/10 | | RDP/4 | graphite/2; MCA/7 |

TABLE 1-continued

|  | Polyurethane/ in parts by weight | Hypophosphite/ in parts by weight | Phosphate/ in parts by weight | Organic phosphorus-based flame retardants/ in parts by weight | Others/ in parts by weight |
|---|---|---|---|---|---|
| Example 39 | WHT-8254/100 | potassium hypophosphite/11 |  | BDP/8 | graphite/7; MCA/10 |
| Example 40 | WHT-8254/100 | sodium hypophosphite/18 |  | RDP/15 | graphite/6; MCA/11 |
| Example 41 | WHT-8254/100 | yttrium hypophosphite/30 |  | BDP/20 | graphite/5; MCA/12 |
| Example 42 | WHT-8254/100 | lanthanum hypophosphite/45 |  | RDP/25 | graphite/4; MCA/13 |
| Example 43 | WHT-8175/100 |  | APP/20 | BDP/10 | graphite/3; MCA/10 |
| Example 44 | WHT-2185/100 |  | ammonium pyrophosphate/30 | BDP/12 | graphite/3; MCA/10 |
| Example 45 | WHT-7180/100 |  | magnesium phosphate/45 | RDP/15 | graphite/3; MCA/ |
| Example 46 | WHT-7190/100 |  | zinc phosphate/45 | RDP/20 | graphite/6; MCA/11 |
| Comparative Example 1 | WHT-1164/100 |  | APP/51 |  | pentaerythritol/17 |
| Comparative Example 2 | WHT-1164/100 |  |  |  | MCA/44 |

Note:
the blank space in Table 1 indicates that no such substance is added.

TABLE 2

|  | Hardness | Tensile strength | Tear strength | Elongation | UL94 | UL94 Note | LOI (%) | Notes |
|---|---|---|---|---|---|---|---|---|
| Example 1 | 68A | 28 MPa | 84 N/mm | 760% | V2$^{-1.5\,mm}$ | dropping during combustion | 28.2 |  |
| Example 2 | 69A | 26 MPa | 81 N/mm | 702% | V2$^{-1.5\,mm}$ | dropping during combustion | 29.2 |  |
| Example 3 | 69A | 22 MPa | 77 N/mm | 650% | V2$^{-3.0\,mm}$ | dropping during combustion | 28.0 |  |
| Example 4 | 69A | 20 MPa | 74 N/mm | 610% | V2$^{-3.0\,mm}$ | dropping during combustion | 27.8 |  |
| Example 5 | 70A | 22 MPa | 78 N/mm | 660% | V2$^{-1.5\,mm}$ | dropping during combustion | 30.2 |  |
| Example 6 | 71A | 21 MPa | 76 N/mm | 630% | V0$^{-1.5\,mm}$ | dropping during combustion | 31.0 |  |
| Example 7 | 68A | 27 MPa | 82 N/mm | 688% | V0$^{-3.0\,mm}$ | without dropping | 30.4 |  |
| Example 8 | 84A | 31 MPa | 94 N/mm | 560% | V0$^{-3.0\,mm}$ | without dropping | 30.4 |  |
| Example 9 | 84A | 30 MPa | 91 N/mm | 552% | V0$^{-3.0\,mm}$ | without dropping | 30.2 |  |
| Example 10 | 83A | 34A | 98 N/mm | 552% | V0$^{-3.0\,mm}$ | without dropping | 30.2 |  |
| Example 11 | 84A | 32 MPa | 96 N/mm | 562% | V0$^{-1.5\,mm}$ | without dropping | 31.2 |  |
| Example 12 | 84A | 30 MPa | 92 N/mm | 522% | V0$^{-1.5\,mm}$ | without dropping | 32.6 |  |
| Example 13 | 82A | 32 MPa | 92 N/mm | 600% | V0$^{-3.0\,mm}$ | without dropping | 30.4 | With excellent processing properties, can be molded by blowing or casting |
| Example 14 | 81A | 31 MPa | 90 N/mm | 620% | V0$^{-3.0\,mm}$ | without dropping | 30.2 |  |
| Example 15 | 80A | 30 MPa | 88 N/mm | 660% | V0$^{-1.5\,mm}$ | without dropping | 30.2 |  |
| Example 16 | 65D | 36 MPa | 114 N/mm | 501% | V0$^{-0.75\,mm}$ | without dropping | 31.8 |  |
| Example 17 | 65D | 35 MPa | 112 N/mm | 512% | V0$^{-1.5\,mm}$ | without dropping | 31.8 |  |

TABLE 2-continued

| | Hardness | Tensile strength | Tear strength | Elongation | UL94 | UL94 Note | LOI (%) | Notes |
|---|---|---|---|---|---|---|---|---|
| Example 18 | 64D | 38 MPa | 120 N/mm | 522% | V0$^{-1.5\,mm}$ | without dropping | 31.4 | |
| Example 19 | 64D | 37 MPa | 116 N/mm | 550% | V2$^{-1.5\,mm}$ | dropping during combustion | 29.2 | |
| Example 20 | 65D | 35 MPa | 105 N/mm | 510% | V0$^{-07.5\,mm}$ | without dropping | 33.8 | |
| Example 21 | 66D | 28 MPa | 99 N/mm | 560% | V0$^{-0.75\,mm}$ | without dropping | 34.8 | |
| Example 22 | 66D | 28 MPa | 98 N/mm | 568% | V0$^{-0.75\,mm}$ | without dropping | 35.0 | |
| Example 23 | 65D | 30 MPa | 101 N/mm | 500% | V2$^{-1.5\,mm}$ | dropping during combustion | 29.0 | |
| Example 24 | 65D | 30 MPa | 101 N/mm | 510% | V2$^{-1.5\,mm}$ | dropping during combustion | 29.2 | |
| Example 25 | 65D | 31 MPa | 102 N/mm | 560% | V0$^{-1.5\,mm}$ | without dropping | 30.8 | |
| Example 26 | 65D | 30 MPa | 101 N/mm | 562% | V0$^{-1.5\,mm}$ | without dropping | 31.0 | |
| Example 27 | 86A | 30 MPa | 85 N/mm | 582% | V2$^{-3.0\,mm}$ | dropping during combustion | 28.2 | |
| Example 28 | 87A | 28 MPa | 80 N/mm | 562% | V0$^{-3.0\,mm}$ | without dropping | 30.0 | |
| Example 29 | 86A | 30 MPa | 85 N/mm | 650% | V2$^{-3.0\,mm}$ | dropping during combustion | 28.2 | |
| Example 30 | 87A | 25 MPa | 85 N/mm | 564% | V0$^{-1.5\,mm}$ | without dropping | 31.4 | |
| Example 31 | 87A | 22 MPa | 81 N/mm | 580% | V0$^{-1.5\,mm}$ | without dropping | 31.8 | |
| Example 32 | 87A | 25 MPa | 85 N/mm | 512% | V0$^{-1.5\,mm}$ | without dropping | 31.0 | |
| Example 33 | 87A | 24 MPa | 88 N/mm | 562% | V0$^{-1.5\,mm}$ | without dropping | 31.0 | |
| Example 34 | 87A | 22 MPa | 80 N/mm | 590% | V0$^{-1.5\,mm}$ | without dropping | 32.4 | |
| Example 35 | 87A | 24 MPa | 85 N/mm | 562% | V0$^{-3.0\,mm}$ | without dropping | 30.0 | |
| Example 36 | 87A | 26 MPa | 90 N/mm | 521% | V0$^{-3.0\,mm}$ | without dropping | 31.2 | |
| Example 37 | 65D | 34 MPa | 102 N/mm | 524% | V0$^{-3.0\,mm}$ | without dropping | 20.0 | |
| Example 38 | 65D | 32 MPa | 100 N/mm | 518% | V0$^{-1.5\,mm}$ | without dropping | 31.0 | With excellent processing properties, can be molded by blowing or casting |
| Example 39 | 65D | 30 MPa | 99 N/mm | 520% | V0$^{-1.5\,mm}$ | without dropping | 31.2 | |
| Example 40 | 65D | 31 MPa | 98 N/mm | 545% | V0$^{-1.5\,mm}$ | without dropping | 32.0 | |
| Example 41 | 66D | 30 MPa | 100 N/mm | 523% | V0$^{-1.5\,mm}$ | without dropping | 33.2 | |
| Example 42 | 66D | 28 MPa | 92 N/mm | 554% | V0$^{-1.5\,mm}$ | without dropping | 34.0 | |
| Example 43 | 75A | 18 MPa | 70 N/mm | 745% | V0$^{-3.0\,mm}$ | without dropping | 29.0 | |
| Example 44 | 88A | 27 MPa | 85 N/mm | 573% | V0$^{-3.0\,mm}$ | without dropping | 30.2 | |
| Example 45 | 90A | 30 MPa | 90 N/mm | 545% | V0$^{-3.0\,mm}$ | without dropping | 31.0 | |
| Example 46 | 90A | 31 MPa | 91 N/mm | 533% | V0$^{-3.0\,mm}$ | without dropping | 31.4 | |
| Comparative Example 1 | 65D | 18 MPa | 80 N/mm | 451% | V0$^{-3.0\,mm}$ | dropping during combustion | 30.4 | |
| Comparative Example 2 | 65D | 20 MPa | 88 N/mm | 412% | V2$^{-3.0\,mm}$ | dropping during combustion | 28.8 | |

Figure 2:
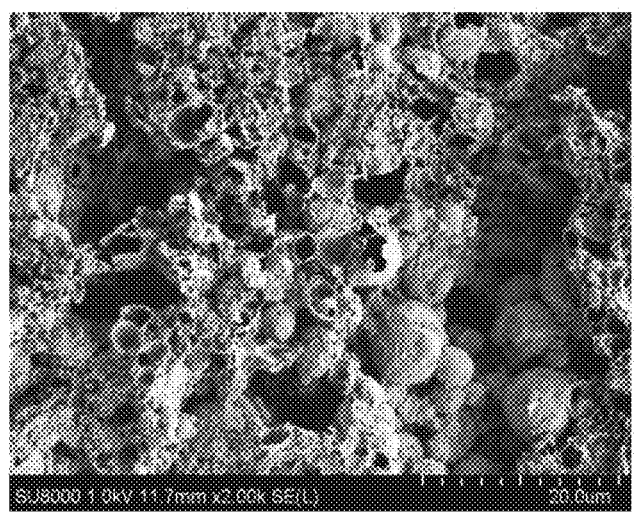
FIG. 2 is a SEM image of the interior of the carbon layer after combustion of the composition of Example 7.

It can be seen from the above examples that, in the present invention, the addition of inorganic phosphorus-based flame retardant alone can obtain a good retardant effect, especially the addition of inorganic hypophosphite; In addition, adding the inorganic phosphorus-based flame retardant can generate synergistic flame retardant effect with graphite or MCA, the flame retardant effect of adding more organic phosphorus-based flame retardants or melamine cyanurate can be achieved under the condition of smaller additive amount of total flame retardant; in which, under the synergistic effect of graphite and the inorganic phosphorous-based flame retardant, a sufficient carbon-forming effect can be achieved with a small additive amount, thus resulting in a carbon layer structure having a dense surface and an internal porous structure (the internal structure of carbon layers in Example 2 and Example 7 is shown in the electron micrographs of FIG. 1 and FIG. 2, wherein, the carbon layer in FIG. 1 is dense, and is consistent with the dense carbon layer structure phase of its surface; the carbon layer in FIG. 2 is a porous structure, it should be noted that its surface is consistent with the dense carbon layer structure phase of the surface of Example 2, and those skilled in the art can understand that due to the porous carbon layer structure formed by the synergistic effect of expandable graphite and inorganic phosphorous, a smaller additive amount can increase the carbon layer volume significantly), which has excellent flame retardant effect.

In addition, it can be seen from the overall of the examples that after the addition of the expandable graphite, the composition does not drip during the combustion process, and after the organic phosphorus-based flame retardant is added, not only the flame retardant effect is better, but also the processability of the composition is more excellent.

The invention claimed is:

1. A halogen-free flame retardant thermoplastic polyurethane elastomer composition comprising a thermoplastic polyurethane and a halogen-free flame retardant composition comprising, based on the weight of the thermoplastic polyurethane:
   inorganic hypophosphite selected from lanthanum hypophosphite, yttrium hypophosphite, or a mixture thereof: 10-45 wt %;
   expandable graphite: 2-7 wt %;
   melamine or derivatives thereof: 7-13 wt %; and
   organic phosphorus-based flame retardant: 4-25 wt %;
   wherein the organic phosphorus-based flame retardant has the structural formula of

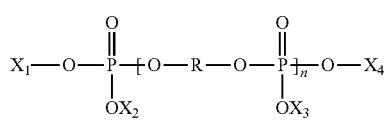

wherein R is

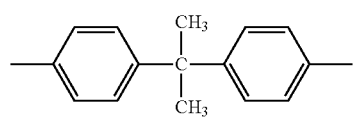

or meta-substituted benzene ring; n is an integer from 1 to 10; $X_1$, $X_2$, $X_3$ and $X_4$ are the same or different and are phenyl or a C6-C18 aryl group containing 1 to 3 C1-C2 alkyl substituent respectively; and
wherein the thermoplastic polyurethane is polyether-based thermoplastic polyurethane.

2. The halogen-free flame-retardant thermoplastic polyurethane elastomer composition according to claim 1, characterized in that the initial expansion temperature of the expandable graphite is 200° C. to 800° C.;
   the average particle diameter of the expandable graphite is 5 μm to 150 μm, and the expansion multiple of the expandable graphite is 20 to 500.

3. The halogen-free flame retardant thermoplastic polyurethane elastomer composition according to claim 1, characterized in that the derivatives of melamine are melamine cyanurate.

4. The halogen-free flame-retardant thermoplastic polyurethane elastomer composition according to claim 1, characterized in that the weight-average molecular weight of the thermoplastic polyurethane is from 60,000 to 800,000.

5. The halogen-free flame-retardant thermoplastic polyurethane elastomer composition according to claim 1, characterized in that the weight ratio of the halogen-free flame retardant composition to the thermoplastic polyurethane elastomer in the composition is 0.2-0.8:1.

6. An article comprising the halogen-free flame retardant thermoplastic polyurethane elastomer composition of claim 1.

7. The halogen-free flame-retardant thermoplastic polyurethane elastomer composition according to claim 1, characterized in that n is an integer from 1 to 5; $X_1$, $X_2$, $X_3$ and $X_4$ are the same or different and are

ortho-substituted

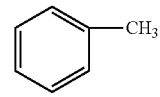

or ortho-substituted

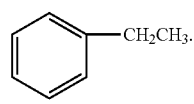

8. The halogen-free flame-retardant thermoplastic polyurethane elastomer composition according to claim 2, characterized in that the initial expansion temperature of the expandable graphite is 210 to 500° C.; and the expansion multiple of the expandable graphite is 30 to 250.

9. The halogen-free flame-retardant thermoplastic polyurethane elastomer composition according to claim 5, characterized in that the weight ratio of the halogen-free flame retardant composition to the thermoplastic polyurethane elastomer in the composition is 0.25-0.45:1.

* * * * *